Jan. 26, 1937.                    J. W. HOWARD                    2,069,008
                                MANUFACTURE OF NUTS
                    Filed March 20, 1936          2 Sheets-Sheet 1

INVENTOR.
Jerome W. Howard
BY Barnes, Kisselle, Laughlin & Raisch
ATTORNEY.

Jan. 26, 1937.  J. W. HOWARD  2,069,008
MANUFACTURE OF NUTS
Filed March 20, 1936   2 Sheets-Sheet 2
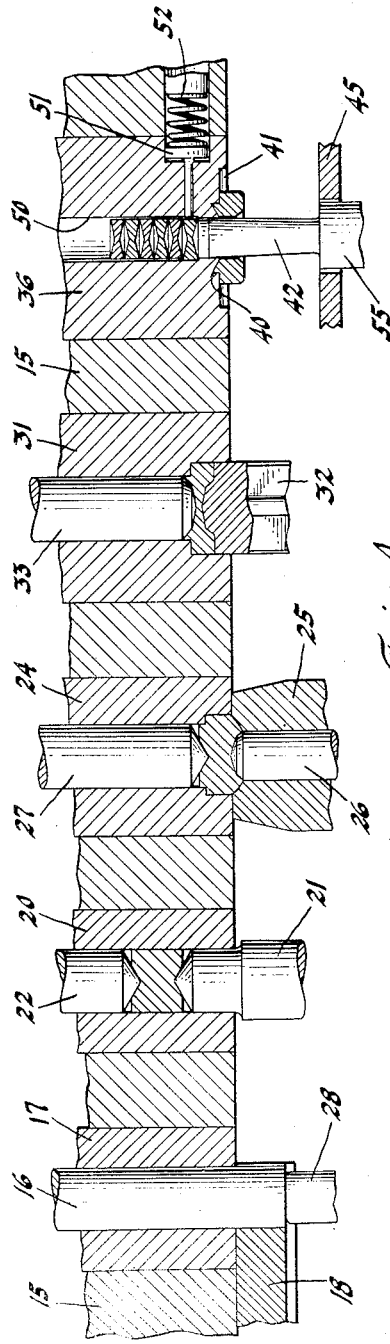
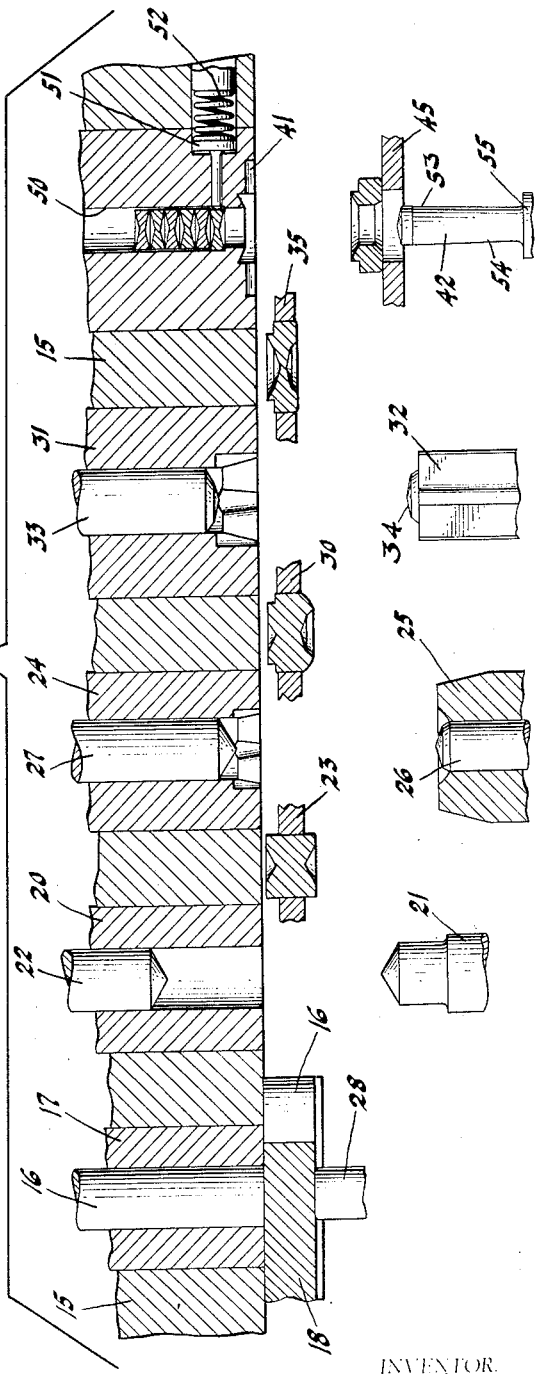
INVENTOR.
Jerome W. Howard
BY
Barnes, Kisselle, Laughlin & Raisch
ATTORNEY.

Patented Jan. 26, 1937

2,069,008

UNITED STATES PATENT OFFICE 2,069,008

MANUFACTURE OF NUTS

Jerome W. Howard, Detroit, Mich.

Application March 20, 1936, Serial No. 69,919

4 Claims. (Cl. 10—86)

This invention relates to the manufacture of nuts, and it has to do especially with the making of nuts of polygonal shape from round stock, wherein the nut has corners of relatively great extent, and wherein the nut is formed wholly by metal upsetting steps.

More definitely, the invention is directed to the making of a nut, which is substantially square, from round upset stock. Of course, insofar as the method is concerned, the nut need not be square, as it may be somewhat oblong or even triangular, the principal thought being that the corners of a nut having four sides or less extend outwardly a relatively great distance from the central aperture. Moreover, the invention has to do with the making of nuts with special forms, such as projections or the like therein, and wherein such forms are provided by the dies of a machine as distinguished from the punches, and as to this phase of the invention the nut may be of any shape, as for example, a hexagon nut.

Moreover, the invention is directed to the provision of a special form of nut arranged to be welded to an apertured support which is to receive a bolt, cap screw or the like for cooperation with the nut. For this purpose a polygonal nut of no more than four sides and four corners is preferred, as the weld connection is accomplished at these corners relatively remote from the internally threaded structure of the nut. To these ends the process is such as to provide a nut especially formed for such a welded connection.

It has been proposed heretofore to make a square nut wherein some of the metal was upset and some sheared off. The present invention entirely eliminates the necessity of shearing off any excess metal, to the end that there is less wastage of metal, and thus the nuts may be more economically produced.

These and other objects will become more apparent as the following detailed description is considered in connection with the accompanying drawings:

Fig. 4 is a view illustrating the several operations performed on a piece of metal to fashion the nut.

Fig. 5 is a view similar to Fig. 4 illustrating a transferring position of the forming mechanism.

Figure 1:
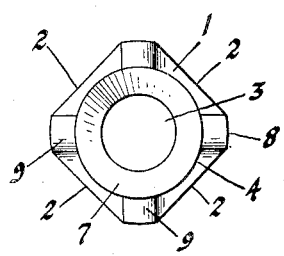
Fig. 1 is a face elevation of a nut which may be constructed in accordance with the invention.
Figure 2:
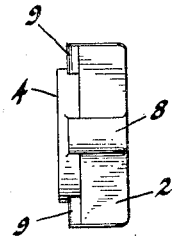
Fig. 2 is a side elevation thereof.
Figure 3:
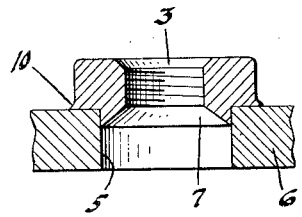
Fig. 3 is a sectional view showing the nut mounted on a support.

As shown in Figs. 1 and 2 the nut, which has been shown for the purpose of the disclosure herein, comprises a substantially square body of metal 1 having four sides 2 which are flat with opposite sides parallel to each other. There is a central aperture 3 designed to be internally threaded as shown in Fig. 3, surrounded by a collar 4. This collar is designed to fit into a recess 5 of a support or the like with which the nut is to be used, the support being shown at 6. The outside periphery of the collar preferably nicely fits the aperture 5. The inside of the collar, however, is preferably beveled or on a taper as shown at 7. The corners of the nut, as distinguished from being sharply defined, may be of some width, and indeed the corners 8 may be on an arc. The underside of the nut, at the corners, and outside of the collar, is fashioned so that the nut may be welded to the support 6. To this end, the underside of each corner is formed with a welding projection 9. These projections preferably are lower than the collar, as shown in Fig. 2.

When the nut is initially placed in the apertured support the collar fits into the aperture and the welding projections 9 rest upon the support. Welding electrodes are now applied, as for example, one to the nut and one to the opposite side of the support, and the electric current passes through the projections 9. As a result the projections 9 are heated to welding heat and the heat is more or less localized at these points, and when pressure is applied the nut is forced down so as to set flush against the support, and four weld connections provided. The metal of the projections 9 may flow somewhat under this pressure, and may protrude as indicated at 10 (Fig. 3). Thus, spot weld connections are provided between the nut and the support. This support, for example, may be any part of an automotive vehicle, such as a frame to which something is to be bolted; and a bolt or cap screw may be passed through the aperture 5 and threaded into the nut. This is an advantageous construction, for example, where access to the nut is impossible or difficult. Due to the fact that the nut has relatively few sides, as for example, being of square or four-sided shape, the corners project from the central opening a considerable distance and the welding heat is localized away from the threaded aperture so as not to in any way spoil or render the nut defective by the heat.

The process may be carried out on a suitable machine for upsetting and forming the metal, as indicated in Figs. 4 and 5. The details of the machine are not shown, as this is deemed unnecessary. The machine, as shown, comprises a die holding block 15. Round stock may be fed through the block, the stock being shown at 16 for which purpose the block may be equipped with a bushing or die 17. The first operation is to cut off the projected end of the stock. It will be understood that the stock will be controlled as to its feeding so that a certain amount projects from the face of the block to be cut off. This may be determined by a stop 28 which may be made adjustable. There may be a knife which reciprocates from left to right as Fig. 4 is viewed, having a cutting member 18 and spring holding arms 19 for clamping the blank. The knife, after cutting off the blank, transfers the same to a point in front of die 20. The transfer action is illustrated in Fig. 5 where the knife has moved the blank about half way over to a point in front of die 20. At the die 20 the blank is formed and sized. For this purpose there is a punch 21. The bottom of the die 20 is formed by a reciprocable member 22. This member and the die slightly recess opposite faces of the blank, as shown.

Figure 8:
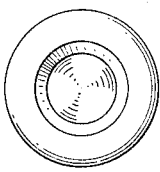
Fig. 8 is an elevational view showing the form of the blank following initial upsetting.

It will be understood that the punch 21, together with others to be described, may be carried by a single reciprocating head so that all advance at once and all retract at once. The punches now retract and the sized blank is again transferred. This may be accomplished by fingers 23 which grip the blank with spring action and transfer it to a die 24. At the die 24 the blank receives its first and partial upsetting action. The bottom of the die is shaped to partially form the collar and welding projections, as shown. The punch has a member 25 which comes up substantially flush against the outside face of the die and an inner punch member 26 which recesses the forward face of the blank. As the punches retract the reciprocable member 27 forces the partially formed blank out of the die 24. The blank may now take a form substantially as shown in Fig. 8. The recess on the front face of the blank is partly formed with two angles by the punch member 26, and the collar and projections on the rear face are partially formed.

The blank is now transferred as by other spring fingers 30 to a location directly in front of the final upsetting die 31. The punches now move forward, and a punch 32 is formed to enter the die 31. The die 31 has a recess which is substantially the shape of the finished nut and the punch 32 has the same cross section so as to enter the die and nicely fit the same. The die has a reciprocable knock-out member 33. The end of the punch 32 is reduced in size to further form the recess on the forward face of the nut. This projection is shown at 34.

Figure 9:
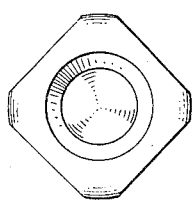
Fig. 9 is a view of the blank following the second or final upsetting step.

The blank now has the shape as shown in Fig. 9, the same being completely formed in shape and contour. The recess on the rear of the face is provided with two angles by reason of the member 33, the outside portion of which becomes the beveled face 7 of the finish nut.

Figure 10:
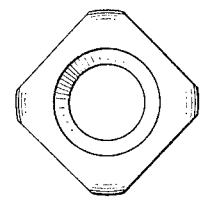
Fig. 10 is an elevational view of the finally shaped nut.

The punches now retract and the formed blank is forced out of the die 31 by the member 33 and then it is transferred by transfer fingers 35 to a point in front of die block 36. This die block is fashioned to receive the formed rear face of the nut, as shown, there being an angular circumferential groove 40 for receiving the collar of the nut, and cross grooves 41 for receiving the projections 9 on the corners. As the punches now advance there is a punch 42, the diameter of which is substantially the same as the diameter of the inner part of the double angle recess in the rear face of the nut. The punch 42 punches out the center portion of the blank, thus providing the aperture 3. The punches now retract and the formed nut is stripped from the punch 42 by a suitable stripper. All that remains now to be done is to tap the aperture in the nut, which is done on suitable machines for this purpose. The final form of the nut is shown in Fig. 10, which is the final form of the nut without the threading. The punched-out pieces remain in the die block 36, the aperture therein being enlarged as shown at 50. The forwardmost piece is held by a plunger 51 spring pressed by a spring 52 so that it will not come out of the die. As the knocked out pieces are advanced into the die by the punch 42 they move past the end of the plunger, the plunger acting in the manner of a detent. The punch 42 preferably has an end portion with straight or cylindrical walls 53 and then the punch tapers somewhat as at 54 to the body 55.

It will be understood that the apparatus performs the four punching operations simultaneously; that is to say, the punches advance and perform work on a blank in each of the dies 20, 24, 31, and 36. Then the punches retract as shown in Fig. 5, and the knife reciprocates as illustrated to cut off another blank from the stock and locate it in front of the die 20, whereas the other pieces are all transferred one step ahead, and the formed nut stripped from the punch 42 and deposited in a suitable container. As before mentioned, a machine for doing this is now available and the details thereof need not be gone into further. When it is said that a machine is available for doing this work, it is meant that there is an apparatus available which, when equipped with the punches and dies disclosed herein, may perform this method.

One thing to which particular attention is to be called is that the collar side of the nut, which must be rather carefully formed and is provided with sharp angles, etc., is formed entirely by the dies and not the punches. Considerable metal may be provided in a die, whereas in a punch, particularly for example the punch 32, which fits into the die 31, there is not much excess metal. Heretofore it has been proposed to have the collar side of the nut formed by the punches; but this was in a process utilizing a shearing step as above mentioned. However, in this case the punch would have to be provided with a recess corresponding to the sharp cornered recess 37 in the die 31, thus leaving only a very small amount of metal surrounding this recess, resulting in a very short life for the punch.

It will be noted that the only wastage of metal is that which is unavoidable, namely, the piece which is punched out of the middle of the nut. Heretofore, it has been proposed to make a square nut which combines an upsetting and shearing method. In accordance with this method, a nut was partially formed into a square shape by upsetting, and then the edges were sheared to provide the final square form. This, however, is disadvantageous for a number of reasons. There is a wastage of metal. The metal sheared from the nut is likely to stick or catch on the die which results in breakage of the punch or die, or both. Moreover, because there is no wastage in the present process, the amount of metal of the initial blank from which a given sized nut is made may be less than that required in the making of the same sized nut where a shearing operation is employed. Accordingly, the method is economical, as a minimum amount of stock is used, as the sharp corners and recesses for forming the collar and welding projections are located in the dies which have a longer life than a punch where the punch is formed to fashion the collar and projections. Breakage of the punches or dies, or both, or the rendering of the punches or dies, or both, defective by reason of the sheared parts getting in the way is entirely eliminated.

Figure 6:
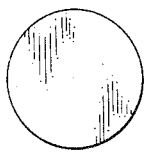
Fig. 6 is an end view of the stock.
Figure 7:
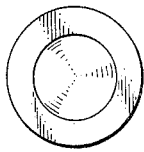
Fig. 7 is an elevational view of the sized blank.
Figure 12:
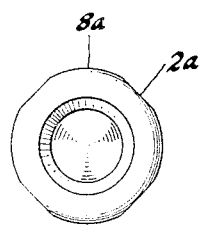
Fig. 12 is a view corresponding to Fig. 8, showing a modified form of invention.
Figure 11:
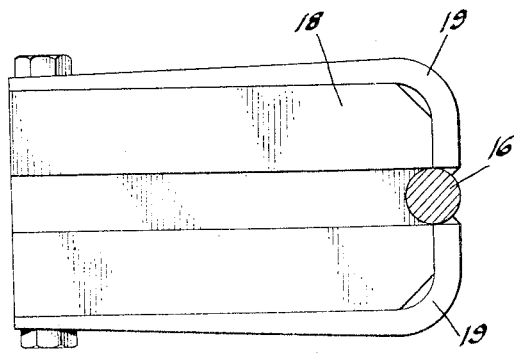
Fig. 11 is a detail view of a transferring cut-off knife.

It will be observed, accordingly, that the blank is cut from round stock, then sized and shaped to be operated on by the punches and dies, then partially formed by metal upsetting, then completely formed by a further metal upsetting step, and then punched out. Fig. 6 shows the blank; Fig. 7 shows the sized and shaped blank; Fig. 8 shows the form of the blank after the initial upsetting and partially forming step; Fig. 9 shows the completely formed blank, while Fig. 10 shows the apertured blank. However, the method may be carried out in a different manner, particularly residing in a difference in the initial forming step. As shown in Fig. 8 the blank, although it has been upset, retains its round over-all form. Now this may be varied by giving the blank a partially squared shape, as shown in Fig. 12. This is done by forming the die 24 with this interior shape. The partially squared sides are shown at 2a but the corners are not as yet definitely formed and may be of relatively long arcs as shown at 8a. Otherwise the blank as illustrated in Fig. 12 is partially upset and the collar on the rear face and the projections are partially formed, as illustrated in Fig. 4.

In some of the claims appended hereto it is specified that the method is for the making of a square type nut. Now the nut shown herein is not exactly square, but it is of the square type. This language so used in the claims is intended to cover a nut of the square type; that is a nut with four sides with rather extending corners therebetween. Some of the claims call for a polygonal shape. This refers only to the sides of the nuts corresponding to the sides 2 and does not include the extending corners even though they may have some area as at 8 as distinguished from being sharp.

Further, in some of the claims appended hereto it is specified that the blank is partially shaped by the initial upsetting step. This language is meant to include both the shape of the metal as shown in Fig. 8 and as shown in Fig. 12.

I claim:

1. The method of making a square type nut with a collar on one side surrounding an aperture in the nut and with welding projections on the collar side of the nut adjacent the corners and outside the periphery of the collar, and wherein the nut is formed from round stock wholly by metal upsetting steps which comprises, subjecting a round blank to pressure to size and shape the same, subjecting the sized and shaped piece to a second punch and die operation to further shape the blank, subjecting the piece to another punch and die operation with the die formed to completely form the collar and welding projections outside the collar and on the corner portions and to finally shape the piece into said square type form, and then punching out the central part of the piece surrounded by the collar.

2. The method of making a square nut, having on one face thereof a collar surrounding the aperture in the nut and having welding projections on said face, one adjacent each corner of the nut and outside of the collar and wherein the outermost portions of the projections are substantially flush with the peripheral surfaces of the nut, from round stock and wholly by metal upsetting steps which comprises, severing a blank from round stock, subjecting the blank to a punch and die operation to shape and size the blank, subjecting the blank to another punch and die operation to flatten the blank and decrease its thickness, subjecting the blank to still another punch and die operation to finally shape the blank into its square form and to form projections on each corner thereof outside of the collar, with the outer surfaces of the projections substantially flush with the outer periphery of the nut, by projection-forming recesses located in the bottom of the die and adjacent the side walls thereof, and then punching out the central portion of the finally shaped blank.

3. The method of making a polygonal shaped nut with no more than four sides, having on one face thereof a collar surrounding the aperture in the nut and having welding projections on said one face with said projections lying outside of the collar and with the outermost surfaces of the projections lying substantially flush with the outer periphery of the nut, from round stock and wholly by metal upsetting steps which comprises, severing a blank from round stock, subjecting the blank to a punch and die operation to shape and size the same, subjecting the blank to another punch and die operation to further shape the same and to at least partially form the collar by a recess formation in the die, again subjecting the blank to a punch and die operation to finally shape the same into its polygonal form and to simultaneously form said projections thereon by recesses in the bottom of the die adjacent the side walls of the die, and then punching out the central portion of the blank.

4. The method of making a square nut with corners having a substantial dimension measured circumferentially of the nut and having on one face thereof a collar surrounding the aperture in the nut and having welding projections on said face, one projection adjacent each corner of the nut and outwardly of the collar, the outer surfaces of each projection constituting substantially a continuation of the surface of the adjacent corner projecting beyond the said face of the nut, from round stock and wholly by metal upsetting steps which comprises, subjecting a round blank to axial pressure to size and shape the same, subjecting the blank to axial pressure to further shape the same and to shape a collar formation on the said one face thereof, subjecting the blank to a punch and die operation wherein the pressure is axial to give the nut its square shape and at the same time to form the said projections by recesses in the bottom of the die, which recesses extend substantially flush to the side walls of the die, and then punching out the central portion of the blank.

JEROME W. HOWARD.